United States Patent
Onuma

(10) Patent No.: US 9,431,174 B2
(45) Date of Patent: Aug. 30, 2016

(54) MULTILAYER CAPACITOR

(71) Applicant: TDK CORPORATION, Tokyo (JP)

(72) Inventor: Takeshi Onuma, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 14/050,965

(22) Filed: Oct. 10, 2013

(65) Prior Publication Data

US 2014/0139970 A1    May 22, 2014

(30) Foreign Application Priority Data

Nov. 21, 2012   (JP) .................... 2012-255571

(51) Int. Cl.
| | |
|---|---|
| H01G 4/30 | (2006.01) |
| H01G 4/232 | (2006.01) |
| H01G 4/228 | (2006.01) |
| H01G 4/12 | (2006.01) |
| H01G 4/06 | (2006.01) |
| H01G 4/012 | (2006.01) |

(52) U.S. Cl.
CPC ............... *H01G 4/30* (2013.01); *H01G 4/012* (2013.01); *H01G 4/232* (2013.01); *H01G 4/12* (2013.01)

(58) Field of Classification Search
CPC ...... H01G 4/30; H01G 4/232; H01G 4/1227; H01G 4/228
USPC .................... 361/306.1, 321.1, 301.4, 321.2
See application file for complete search history.

(56) References Cited

U.S. PATENT DOCUMENTS

| | | | | |
|---|---|---|---|---|
| 4,356,529 | A * | 10/1982 | Kopel ........................... | 361/304 |
| 4,590,537 | A * | 5/1986 | Sakamoto .................. | 361/306.3 |
| 2004/0105214 | A1* | 6/2004 | Nakamura et al. ........ | 361/321.2 |
| 2011/0102969 | A1* | 5/2011 | Togashi ................ | H01G 4/012 361/306.3 |
| 2012/0019981 | A1* | 1/2012 | Yoshida .................... | 361/321.1 |
| 2012/0194963 | A1 | 8/2012 | Kuroda et al. | |

FOREIGN PATENT DOCUMENTS

| | | |
|---|---|---|
| JP | H09-55333 A | 2/1997 |
| JP | 2011-100830 A | 5/2011 |
| JP | 2012-156471 A | 8/2012 |

\* cited by examiner

*Primary Examiner* — Eric Thomas
*Assistant Examiner* — Arun Ramaswamy
(74) *Attorney, Agent, or Firm* — Oliff PLC

(57) ABSTRACT

An element body has a substantially rectangular parallelepiped shape whose length in a longitudinal direction and length in a width direction are larger than a length in a height direction. The element body has first and second principal faces opposed to each other in the height direction, first and second side faces opposed to each other in the width direction, and third and fourth side faces opposed to each other in the longitudinal direction. A plurality of internal electrodes are alternately arranged in the element body so as to be opposed to each other in the height direction. Each internal electrode has a main electrode portion and a leading portion. Each of a plurality of terminal electrodes has a first electrode portion arranged on the first principal face, and a second electrode portion arranged on the first side face and connected to the leading portion of each corresponding internal electrode.

13 Claims, 17 Drawing Sheets

Fig.5
(a)
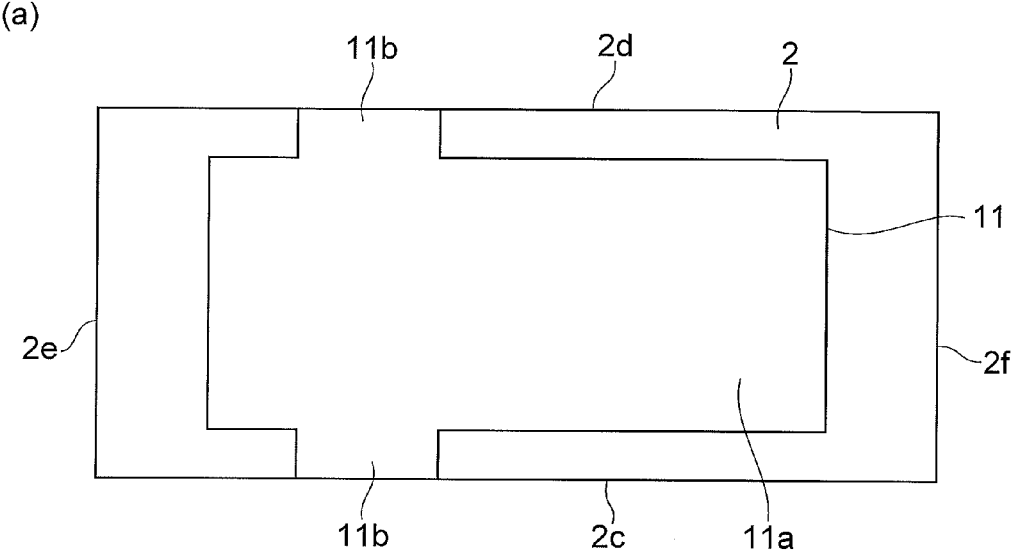
(b)
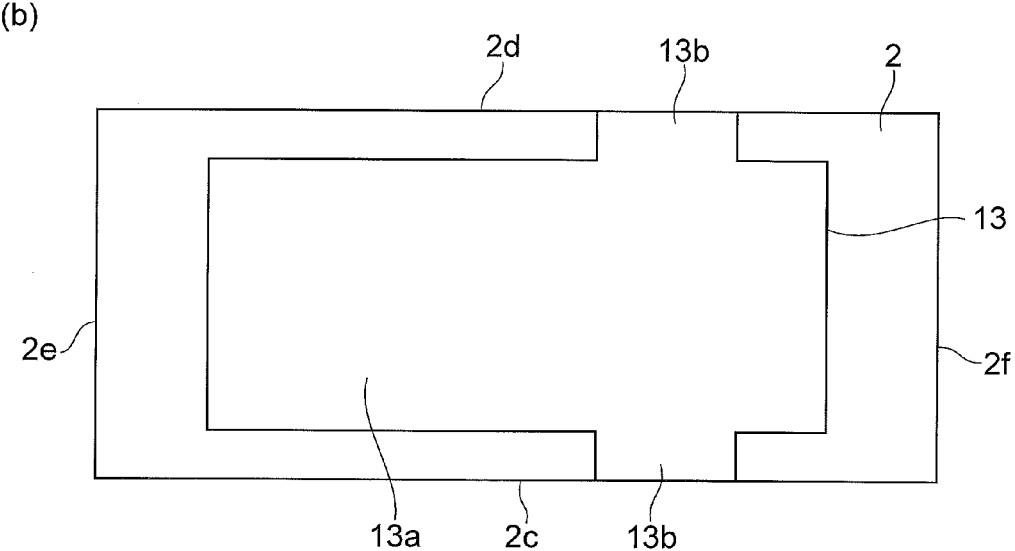

*Fig.11*
(a)
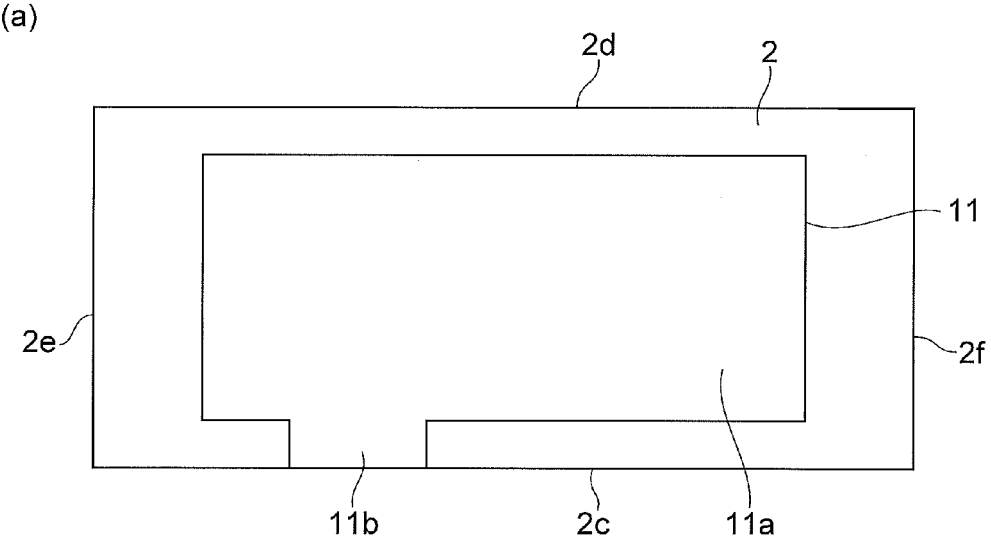
(b)
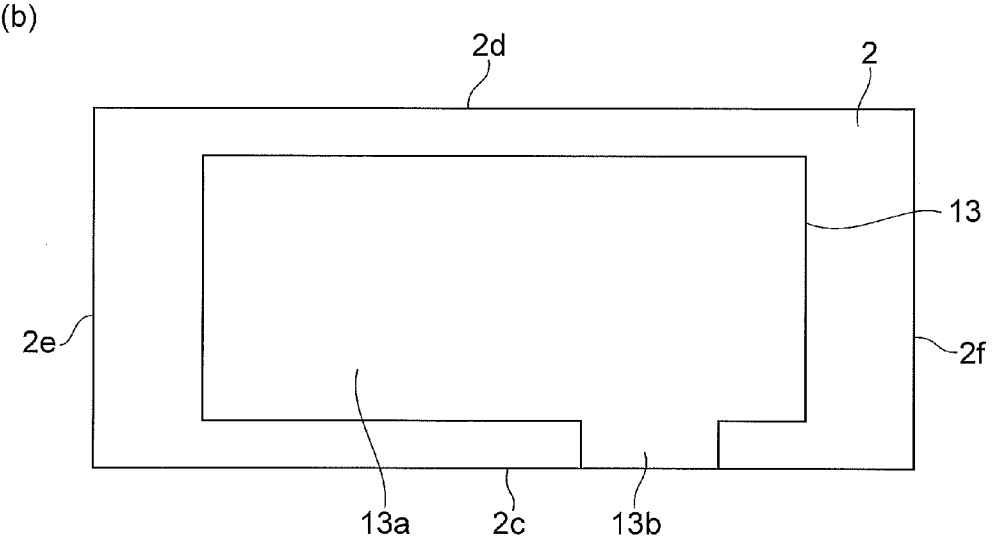

*Fig.15*
(a)
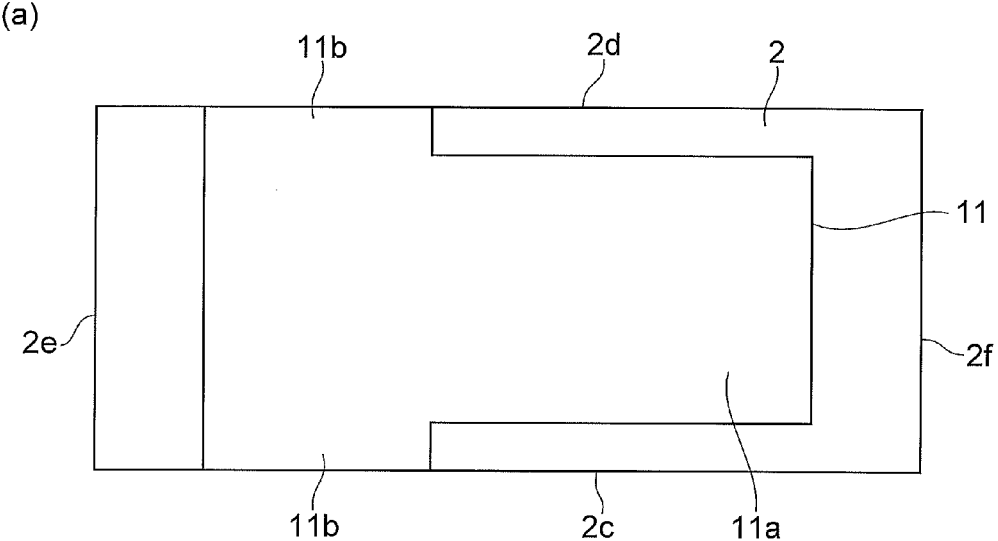
(b)
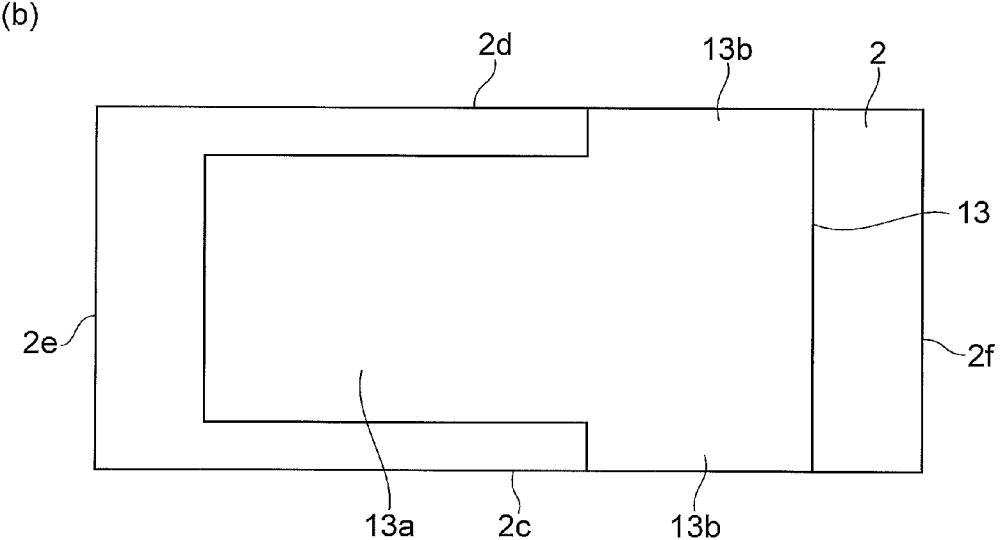

Fig.16
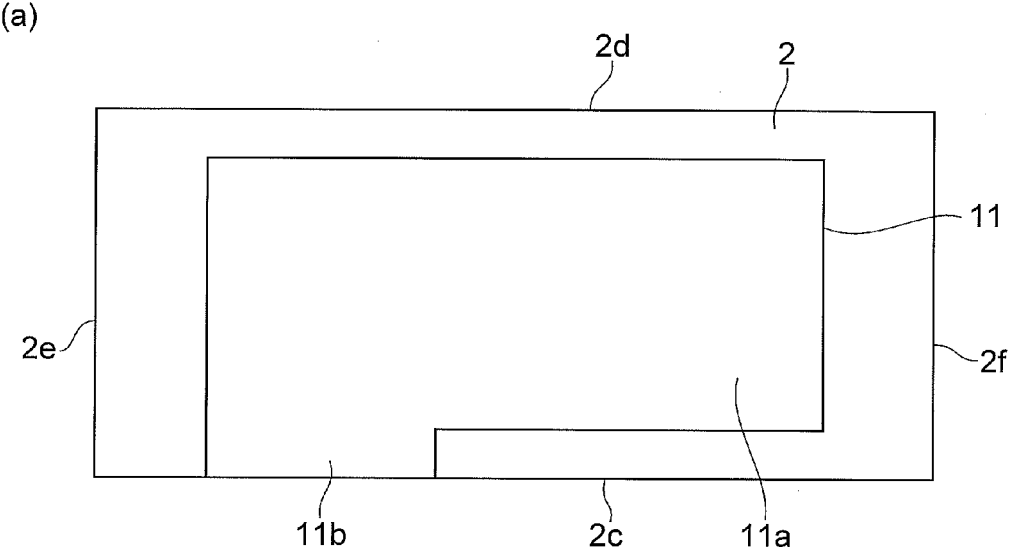
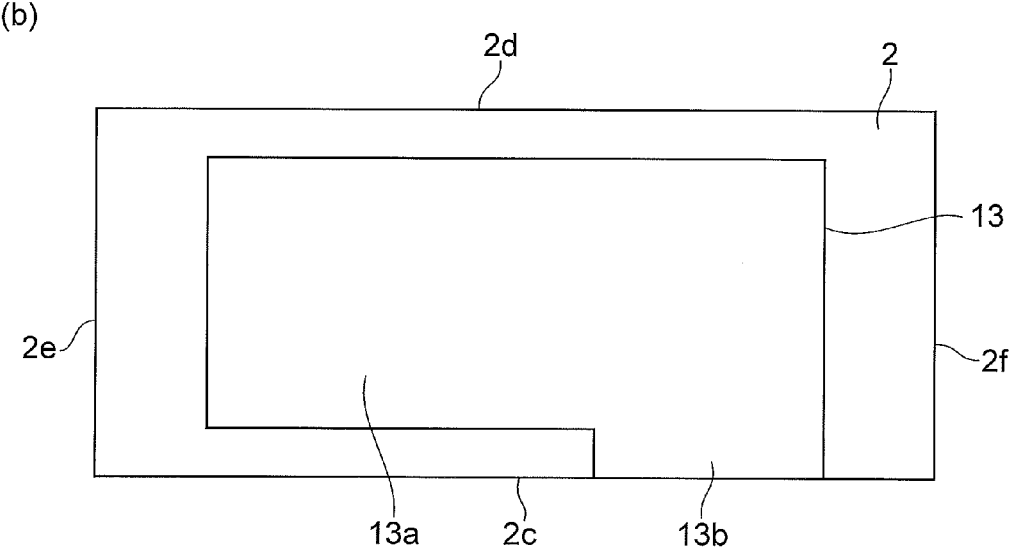

MULTILAYER CAPACITOR

BACKGROUND OF THE INVENTION

1. Field of the Invention

The present invention relates to a multilayer capacitor.

2. Related Background Art

There is a known multilayer capacitor provided with: an element body having a substantially rectangular parallelepiped shape whose length in the longitudinal direction and length in the width direction are larger than a length in the height direction and having a pair of principal faces opposed to each other in the height direction, a pair of side faces extending in the height direction so as to connect the pair of principal faces and opposed to each other in the width direction, and a pair of end faces extending in the height direction so as to connect the pair of principal faces and opposed to each other in the longitudinal direction; a plurality of internal electrodes alternately arranged in the element body so as to be opposed to each other in the height direction; and a plurality of terminal electrodes each of which has electrode portions arranged on the pair of principal faces and an electrode portion arranged on the corresponding end face and connected to the corresponding internal electrodes (e.g., cf. Japanese Patent Application Laid-Open Publication No. 2010-129737).

SUMMARY OF THE INVENTION

However, the multilayer capacitor described in the Laid-Open Publication No. 2010-129737 can have the problem as described below. In the multilayer capacitor described in the Laid-Open Publication No. 2010-129737, the terminal electrodes are connected to the corresponding internal electrodes, in the electrode portions arranged on the end faces. For this reason, an electric current path is long in the multilayer capacitor, resulting in a high equivalent series inductance (ESL).

It is an object of the present invention to provide a multilayer capacitor capable of achieving reduction of ESL.

A multilayer capacitor according to the present invention is one comprising: an element body having a substantially rectangular parallelepiped shape whose length in a longitudinal direction and length in a width direction are larger than a length in a height direction, and having first and second principal faces opposed to each other in the height direction, first and second side faces extending in the height direction so as to connect the first and second principal faces and opposed to each other in the width direction, and third and fourth side faces extending in the height direction so as to connect the first and second principal faces and opposed to each other in the longitudinal direction; a plurality of internal electrodes which are alternately arranged in the element body so as to be opposed to each other in the height direction of the element body and each of which has a main electrode portion opposed to another main electrode portion in the height direction of the element body and a leading portion extending from the main electrode portion to be exposed in the first side face; and a plurality of terminal electrodes each of which has a first electrode portion arranged on the first principal face, and a second electrode portion arranged on the first side face and connected to the leading portion of each corresponding internal electrode out of the plurality of internal electrodes.

In the multilayer capacitor according to the present invention, each of the plurality of terminal electrodes has the first electrode portion arranged on the first principal face, and the second electrode portion arranged on the first side face. Each terminal electrode is connected to the leading portion of each corresponding internal electrode, in the second electrode portion arranged on the first side face. Therefore, between the internal electrodes adjacent in the height direction of the element body and different in polarity, the distance between the leading portions is shorter in the multilayer capacitor according to the present invention than in the multilayer capacitor in which the terminal electrodes are connected to the corresponding internal electrodes in the electrode portions arranged on the end faces. As a result, the electric current path becomes shorter in the multilayer capacitor, thereby achieving reduction of ESL.

The third and fourth side faces of the element body may be exposed. In this case, the terminal electrodes are not arranged on the third and fourth side faces of the element body. Therefore, there is no increase in the length of the multilayer capacitor in the longitudinal direction of the element body, thereby allowing easy achievement of downsizing of the multilayer capacitor.

A length of the first electrode portion in the width direction of the element body may be larger than the length in the height direction of the element body. The multilayer capacitor with the element body of the substantially rectangular parallelepiped shape whose length in the longitudinal direction and length in the width direction are larger than the length in the height direction is mounted as buried in a substrate or the like, as also described in the foregoing Laid-Open Publication No. 2010-129737. In this case, the terminal electrodes of the multilayer capacitor are electrically connected, for example, through via conductors formed in the substrate to electrodes arranged on the surface of the substrate. Namely, the first electrode portion of the terminal electrode is connected to the via conductor. When the length of the first electrode portion in the width direction of the element body is larger than the length in the height direction of the element body, the area of the first electrode portion is relatively large, allowing secure connection between the first electrode portion (terminal electrode) and the via conductor.

The second side face of the element body may be exposed. In this case, the terminal electrodes are not arranged on the second side face of the element body. Therefore, there is no increase in the length of the multilayer capacitor in the width direction of the element body, thereby allowing easy achievement of downsizing of the multilayer capacitor.

The first electrode portion may have a sintered electrode layer arranged on the first principal face, and a plated layer arranged on the sintered electrode layer. In this case, the first electrode portion can be securely connected to the via conductor when the multilayer capacitor is mounted as buried in the substrate or the like, as described above.

A length of the second electrode portion in the longitudinal direction of the element body may be smaller than a length of the first electrode portion in the longitudinal direction of the element body. In this case, the area of the second electrode portion is relatively smaller and thus less stress is generated in forming the second electrode portion on the element body. As a result, the element body can be prevented from suffering from a structural defect such as a crack.

A region near the third side face and a region near the fourth side face in the first side face of the element body may be exposed. In this case, the area of the second electrode portion is relatively smaller. Therefore, less stress is generated in forming the second electrode portion on the element body and thus the element body can be prevented from suffering from a structural defect such as a crack.

The second electrode portion may be arranged nearer to a center in the longitudinal direction of the element body than the first electrode portion is. In this case, between the internal electrodes different in polarity, the distance between the leading portions becomes much shorter. As a result, ESL can be further reduced.

A length of the first electrode portion in the longitudinal direction of the element body may be larger than a space between the first electrode portions adjacent in the longitudinal direction of the element body. In this case, the area of the first electrode portion is relatively large and the first electrode portion (terminal electrode) can be securely connected to the via conductor.

The element body may include a first element body portion in which the plurality of internal electrodes are arranged, and a pair of second element body portions arranged with the first element body portion in between in the height direction of the element body, and a length of the first element body portion in the height direction of the element body may be equal to a length of the second element body portion in the height direction of the element body. In this case, the second element body portions function as protecting layers and the thickness thereof is relatively large. As a result, while ensuring the capacitance, the element body can be prevented from cracking.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 5 is plan views showing first and second internal electrodes.

FIG. 11 is plan views showing first and second internal electrodes.

FIG. 15 is plan views showing a modification example of the first and second internal electrodes.

FIG. 16 is plan views showing another modification example of the first and second internal electrodes.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference signs, without redundant description.

Figure 1:
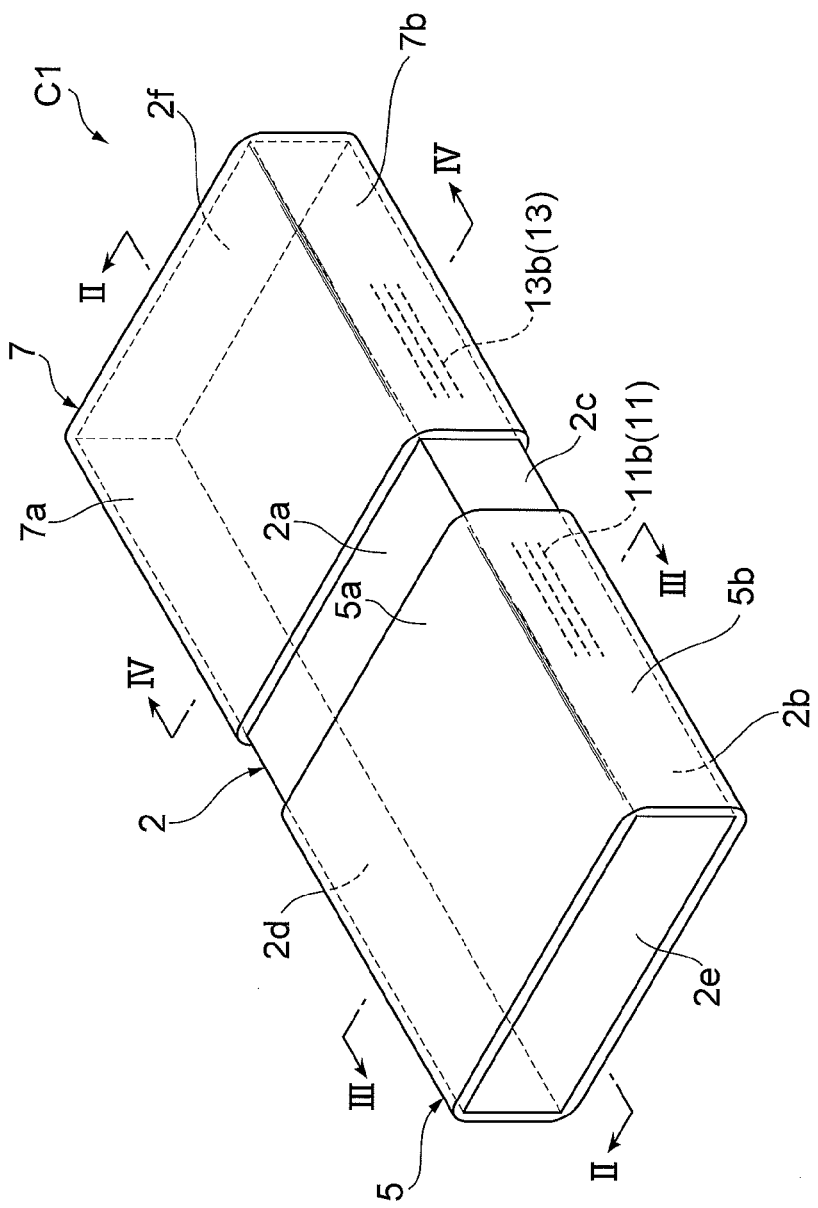
FIG. 1 is a perspective view showing a multilayer capacitor according to an embodiment of the present invention.
Figure 2:
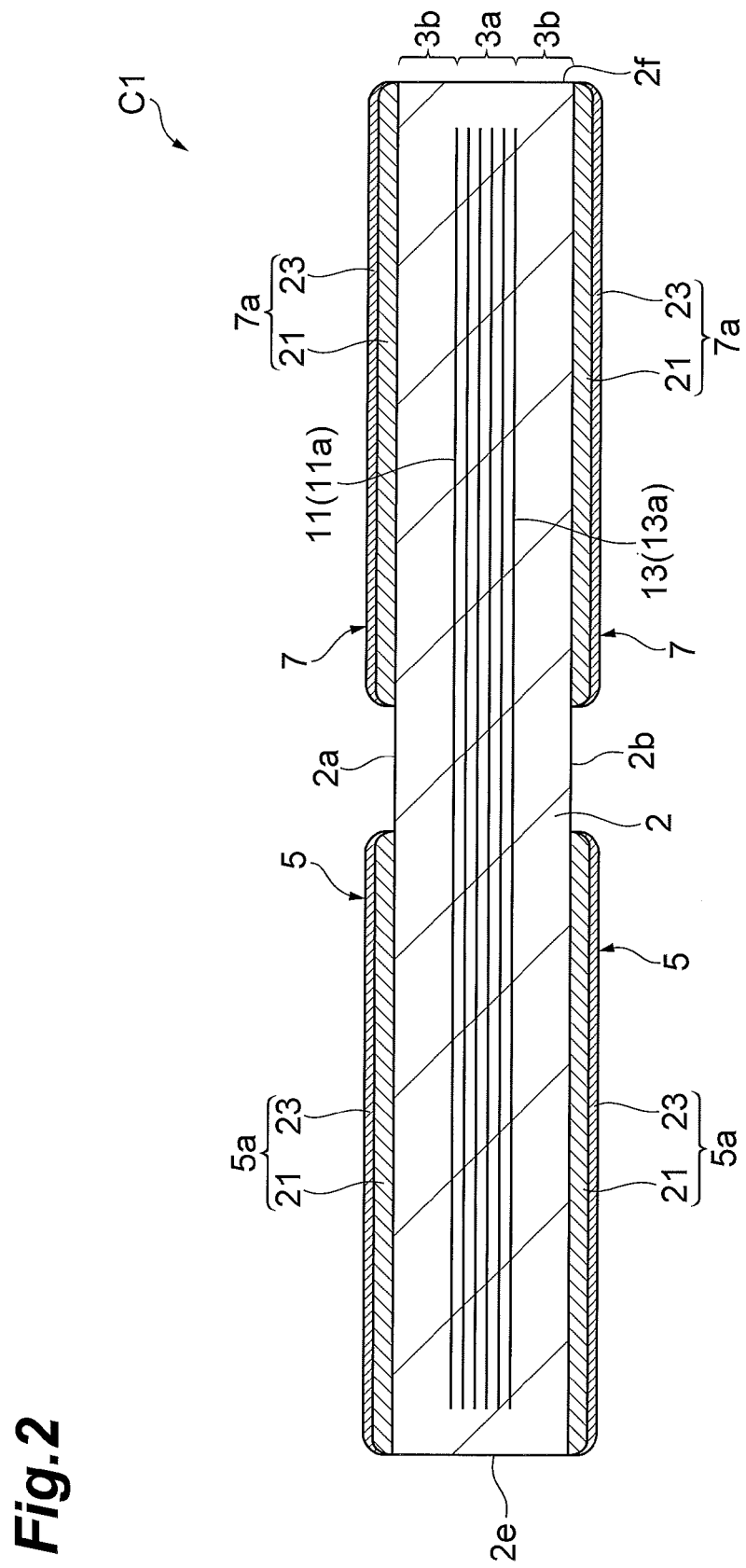
FIG. 2 is a drawing for explaining a cross-sectional configuration along the line II-II in FIG. 1.
Figure 3:
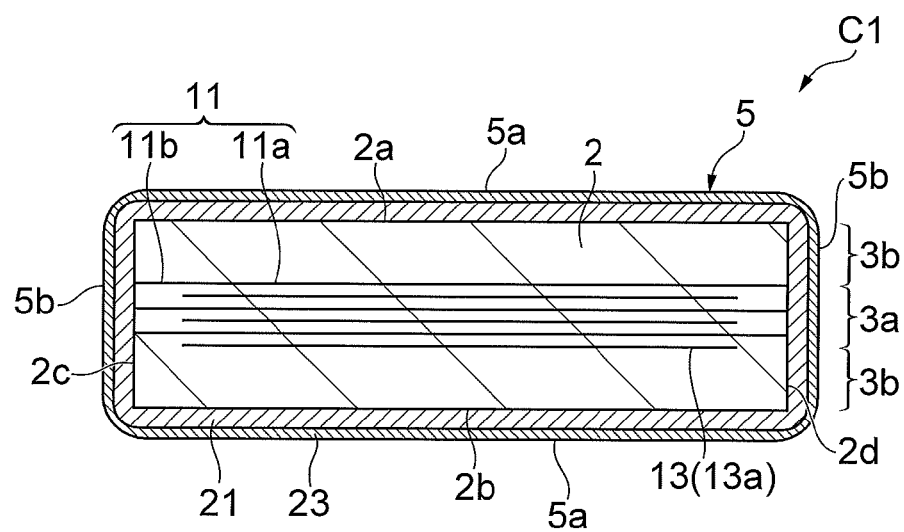
FIG. 3 is a drawing for explaining a cross-sectional configuration along the line III-III in FIG. 1.
Figure 4:
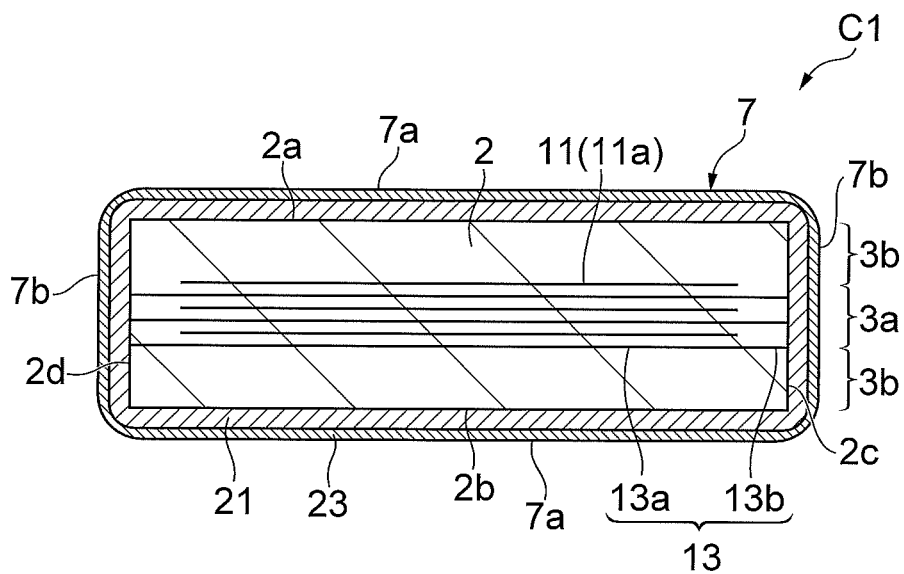
FIG. 4 is a drawing for explaining a cross-sectional configuration along the line IV-IV in FIG. 1.

A configuration of a multilayer capacitor C1 according to an embodiment of the present invention will be described with reference to FIGS. 1 to 4. FIG. 1 is a perspective view showing the multilayer capacitor according to the embodiment of the present invention. FIG. 2 is a drawing for explaining a cross-sectional configuration along the line II-II in FIG. 1. FIG. 3 is a drawing for explaining a cross-sectional configuration along the line III-III in FIG. 1. FIG. 4 is a drawing for explaining a cross-sectional configuration along the line IV-IV in FIG. 1.

The multilayer capacitor C1, as shown in FIGS. 1 to 4, is provided with an element body 2 and with a first terminal electrode 5 and a second terminal electrode 7 arranged on the exterior surface of the element body 2. The first terminal electrode 5 and the second terminal electrode 7 are separated from each other on the exterior surface of the element body 2.

The element body 2 has a substantially rectangular parallelepiped shape. The element body 2 has, as its exterior surface, first and second principal faces 2a, 2b of a substantially rectangular shape opposed to each other, first and second side faces 2c, 2d opposed to each other, and third and fourth side faces 2e, 2f opposed to each other. A longitudinal direction of the element body 2 is a direction in which the third side face 2e and the fourth side face 2f are opposed. A width direction of the element body 2 is a direction in which the first side face 2c and the second side face 2d are opposed. A height direction of the element body 2 is a direction in which the first principal face 2a and the second principal face 2b are opposed.

The element body 2 has a length (L) in the longitudinal direction and a length (W) in the width direction set larger than a length (H) in the height direction. The length (L) in the longitudinal direction is set, for example, in the range of approximately 0.4 to 1.6 mm. The length (W) in the width direction is set, for example, in the range of approximately 0.2 to 0.8 mm. The length (H) in the height direction is set, for example, in the range of approximately 0.1 to 0.35 mm. The multilayer capacitor C1 is an ultralow profile multilayer capacitor.

The first and second side faces 2c, 2d extend in the direction in which the first and second principal faces 2a and 2b are opposed, so as to connect the first and second principal faces 2a and 2b. The first and second side faces 2c, 2d also extend in the direction in which the third and fourth side faces 2e and 2f are opposed (or in the long-side direction of the first and second principal faces 2a, 2b). The third and fourth side faces 2e, 2f extend in the direction in which the first and second principal faces 2a and 2b are opposed, so as to connect the first and second principal faces 2a and 2b. The third and fourth side faces 2e, 2f also extend in the direction in which the first and second side faces 2c and 2d are opposed (or in the short-side direction of the first and second principal faces 2a, 2b).

The element body 2 includes a first element body portion 3a, and a pair of second element body portions 3b arranged with the first element body portion 3a in between in the height direction of the element body 2. The length (thickness) of the first element body portion 3a in the height direction of the element body 2 is set to be equal to the length (thickness) of the second element body portion 3b in the height direction of the element body 2. The thicknesses of the first and second element body portions 3a, 3b are set, for example, in the range of approximately 0.02 to 0.11 mm.

The element body 2 is composed of a plurality of dielectric layers laminated in the direction in which the first and second principal faces 2a and 2b are opposed (or in the height direction of the element body 2). In the element body 2, the direction in which the plurality of dielectric layers are laminated agrees with the direction in which the first and second principal faces 2a and 2b are opposed. Each dielectric layer is comprised, for example, of a sintered body of a ceramic green sheet containing a dielectric material (e.g., a dielectric ceramic such as $BaTiO_3$, $Ba(Ti, Zr)O_3$, or $(Ba, Ca)TiO_3$ type). In actual element body 2, the dielectric layers are integrated with each other so that no boundary can be visually recognized between the dielectric layers.

The multilayer capacitor C1, as shown in FIGS. 2 to 4, is provided with a plurality of first internal electrodes 11 and a plurality of second internal electrodes 13 as a plurality of internal electrodes. The plurality of first and second internal electrodes 11, 13 each are arranged in the first element body portion 3a of the element body 2. The first and second internal electrodes 11, 13 are not arranged in each second element body portion 3b. The first and second internal electrodes 11, 13 are comprised of an electroconductive material (e.g., Ni or Cu or the like) normally used as internal electrodes in multilayer electric elements. The first and second internal electrodes 11, 13 are comprised of sintered bodies of an electroconductive paste containing the aforementioned electroconductive material.

The first internal electrodes 11 and the second internal electrodes 13 are arranged at different positions (layers) in the height direction of the element body 2. Specifically, the first internal electrodes 11 and the second internal electrodes 13 are alternately arranged in the element body 2 so as to be opposed to each other with a space in the height direction of the element body 2. The first internal electrodes 11 and the second internal electrodes 13 are different in polarity from each other.

Each first internal electrode 11, as shown in (a) of FIG. 5, includes a main electrode portion 11a and a pair of leading portions 11b. The main electrode portion 11a has a substantially rectangular shape. Each leading portion 11b extends from a corresponding side of the main electrode portion 11a and is exposed in the corresponding side face 2c or 2d. Each second internal electrode 13, as shown in (b) of FIG. 5, includes a main electrode portion 13a and a pair of leading portions 13b. The main electrode portion 13a has a substantially rectangular shape and is opposed to the main electrode portion 11a. Each leading portion 13b extends from a corresponding side of the main electrode portion 13a and is exposed in the corresponding side face 2c or 2d.

The position where the leading portions 11b are exposed in the first and second side faces 2c, 2d is nearer to the third side face 2e with respect to centers of the first and second side faces 2c, 2d in the longitudinal direction of the element body 2. The position where the leading portions 13b are exposed in the first and second side faces 2c, 2d is nearer to the fourth side face 2f with respect to the centers of the first and second side faces 2c, 2d in the longitudinal direction of the element body 2. The first and second internal electrodes 11, 13 are directly exposed in only the first and second side faces 2c, 2d but are not exposed in the first and second principal faces 2a, 2b, nor in the third and fourth side faces 2e, 2f.

The first terminal electrode 5 has a pair of electrode portions 5a arranged on the first and second principal faces 2a, 2b, and a pair of electrode portions 5b arranged on the first and second side faces 2c, 2d. The electrode portions 5a and the electrode portions 5b are connected at ridge portions of the element body 2 and electrically connected to each other. The first terminal electrode 5 is formed across the first and second principal faces 2a, 2b and the first and second side faces 2c, 2d.

The electrode portions 5a have a substantially rectangular shape on a plan view thereof. The electrode portions 5a are located nearer to the third side face 2e with respect to the centers of the respective principal faces 2a, 2b in the longitudinal direction of the element body 2. The electrode portions 5b have a substantially rectangular shape on a plan view thereof. The electrode portions 5a are formed across between the end near the first side face 2c and the end near the second side face 2d, in the respective principal faces 2a, 2b. The length of the electrode portions 5a in the width direction of the element body 2 is set larger than the length in the height direction of the element body 2.

The electrode portions 5b are located nearer to the third side face 2e with respect to the centers of the respective side faces 2c, 2d in the longitudinal direction of the element body 2. The electrode portions 5b are arranged so as to cover all the exposed portions of the respective leading portions 11b in the corresponding side faces 2c, 2d. The leading portions 11b are directly connected to the first terminal electrode 5. This causes each first internal electrode 11 to be electrically connected to the first terminal electrode 5. The length of the electrode portions 5b in the longitudinal direction of the element body 2 is set to be equal to the length of the electrode portions 5a in the longitudinal direction of the element body 2.

The second terminal electrode 7 has a pair of electrode portions 7a arranged on the first and second principal faces 2a, 2b, and a pair of electrode portions 7b arranged on the first and second side faces 2c, 2d. The electrode portions 7a and the electrode portions 7b are connected at ridge portions of the element body 2 and electrically connected to each other. The second terminal electrode 7 is formed across the first and second principal faces 2a, 2b and the first and second side faces 2c, 2d.

The electrode portions 7a have a substantially rectangular shape on a plan view thereof. The electrode portions 7a are located nearer to the fourth side face 2f with respect to the centers of the respective principal faces 2a, 2b in the longitudinal direction of the element body 2. The electrode portions 7b have a substantially rectangular shape on a plan view thereof. The electrode portions 7a are formed across between the end near the first side face 2c and the end near the second side face 2d, in the respective principal faces 2a, 2b. The length of the electrode portions 7a in the width direction of the element body 2 is set larger than the length in the height direction of the element body 2.

The electrode portions 7b are located nearer to the fourth side face 2f with respect to the centers of the respective side faces 2c, 2d in the longitudinal direction of the element body 2. The electrode portions 7b are arranged so as to cover all the exposed portions of the respective leading portions 13b in the corresponding side faces 2c, 2d. The leading portions 13b are directly connected to the second terminal electrode 7. This causes each second internal electrode 13 to be electrically connected to the second terminal electrode 7. The length of the electrode portions 7b in the longitudinal direction of the element body 2 is set to be equal to the length of the electrode portions 7a in the longitudinal direction of the element body 2.

Each of the first and second terminal electrodes 5, 7 includes a first electrode layer 21 and a second electrode layer 23. Namely, each of the electrode portions 5a, 5b and the electrode portions 7a, 7b includes the first electrode layer 21 and the second electrode layer 23.

The first electrode layer 21 is formed by applying an electroconductive paste onto the the surface of the element body 2 and sintering it. Namely, the first electrode layer 21 is a sintered electrode layer. The electroconductive paste to be used herein is one prepared by mixing a glass component, an organic binder, and an organic solvent in a powder consisting of metal (e.g., Cu, Ni, Ag, or Pd).

The second electrode layer 23 is formed on the first electrode layer 21 by a plating method. In the present embodiment, the second electrode layer 23 includes an Ni-plated layer formed by Ni plating on the first electrode layer 21, and an Sn-plated layer formed by Sn plating on the Ni-plated layer. The second electrode layer 23 may be a Cu-plated layer formed by Cu plating on the first electrode layer 21. The second electrode layer 23 may be omitted.

The terminal electrodes 5, 7 are not arranged on the third and fourth side faces 2e, 2f of the element body 2. For this reason, the third and fourth side faces 2e, 2f of the element body 2 are exposed. The length of the electrode portions 5a in the longitudinal direction of the element body 2 is set longer than a space between the electrode portions 5a and the electrode portions 7a adjacent in the longitudinal direction of the element body 2.

In the present embodiment, as described above, each of the first and second terminal electrodes 5, 7 has the electrode portions 5a, 7a arranged on the respective principal faces 2a, 2b and the electrode portions 5b, 7b arranged on the respective side faces 2c, 2d. Each terminal electrode 5, 7 is connected to the leading portions 11b, 13b of the corresponding internal electrodes 11, 13, in the electrode portions 5b, 7b. Therefore, between the internal electrodes 11, 13 adjacent in the height direction of the element body 2 and different in polarity, the distance between the leading portions 11b, 13b is shorter in the multilayer capacitor C1 than in the multilayer capacitor in which the terminal electrodes are connected to the corresponding internal electrodes in the electrode portions arranged on the end faces. This makes the electric current path shorter in the multilayer capacitor C1, thereby achieving reduction of ESL.

In the multilayer capacitor C1, the third and fourth side faces 2e, 2f of the element body 2 are exposed and the terminal electrodes 5, 7 are not arranged on these third and fourth side faces 2e, 2f. Therefore, there is no increase in the length of the multilayer capacitor C1 in the longitudinal direction of the element body 2, which allows easy achievement of downsizing of the multilayer capacitor C1.

Figure 6:
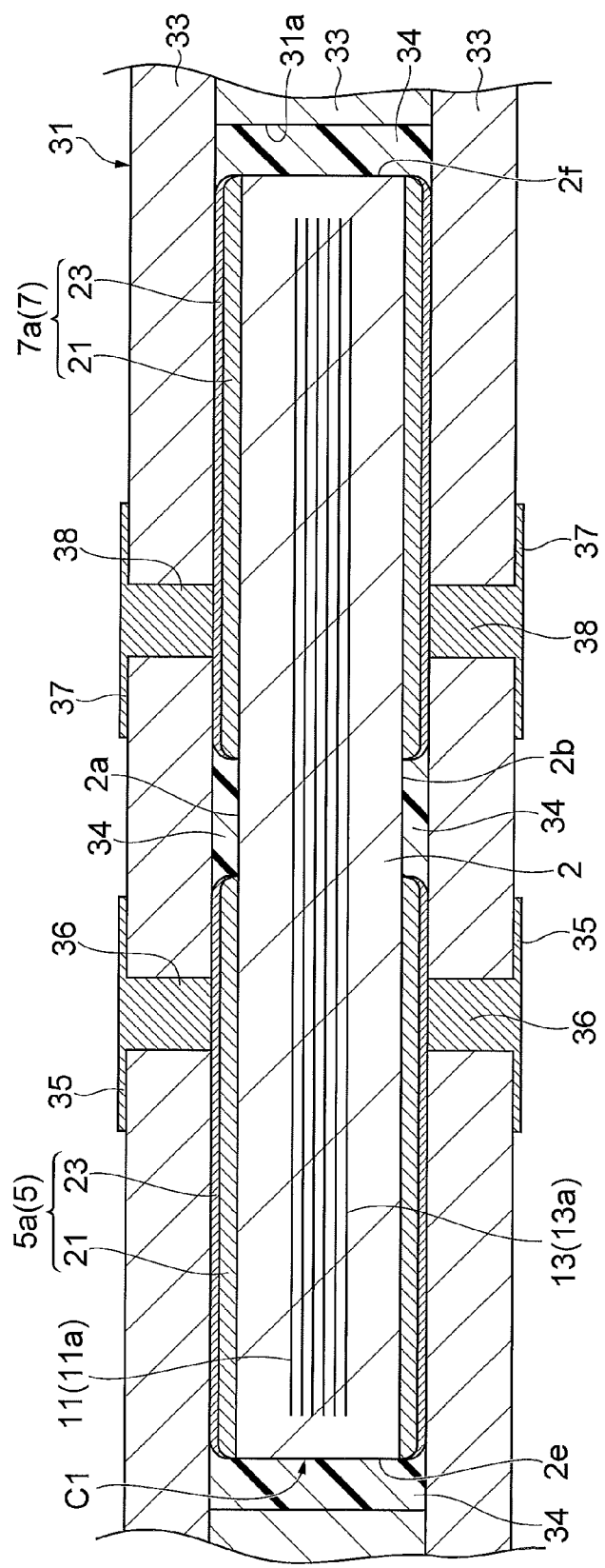
FIG. 6 is a drawing for explaining a mounted structure of the multilayer capacitor according to the embodiment.

The multilayer capacitor C1 can be mounted as buried in an electronic device (e.g., a circuit board, an electronic component, or the like). A mounted structure of the multilayer capacitor C1 will be described with reference to FIG. 6. FIG. 6 is a drawing for explaining the mounted structure of the multilayer capacitor according to the embodiment of the present embodiment.

The multilayer capacitor C1, as shown in FIG. 6, is mounted as buried in a substrate 31. The substrate 31 is composed of a plurality of insulating layers 33 laminated. The insulating layers 33 are comprised of an insulating material such as ceramic or resin and are integrated with each other by adhesion or the like.

The multilayer capacitor C1 is arranged in a housing portion 31a formed in the substrate 31 and is fixed to the substrate 31 with resin 34 filled in the housing portion 31a. This causes the multilayer capacitor C1 to be buried in the substrate 31. The multilayer capacitor C1 is electrically connected through via conductors 36, 38 to electrodes 35, 37 arranged on the surface of the substrate 31. Namely, the first terminal electrode 5 is electrically connected through the via conductors 36 to the electrodes 35 and the second terminal electrode 7 is electrically connected through the via conductors 38 to the electrodes 37.

The electrode portions 5a of the first terminal electrode 5 are connected to the via conductors 36. The electrode portions 7a of the second terminal electrode 7 are connected to the via conductors 38. The via conductors 36, 38 are formed by growing an electroconductive metal (e.g., Cu or the like) in via holes formed in the substrate 31, by electroless plating or the like. The via holes are formed by laser processing or the like so as to reach the electrode portions 5a, 7a of the first and second terminal electrodes 5, 7 of the multilayer capacitor C1 from the surface side of the substrate 31.

In the multilayer capacitor C1, the length of the electrode portions 5a, 7a in the width direction of the element body 2 is set larger than the length in the height direction of the element body 2. For this reason, the area of the electrode portions 5a, 7a is relatively large and thus the electrode portions 5a, 7a can be securely connected to the via conductors 36, 38.

In the multilayer capacitor C1, the electrode portions 5a, 7a have the first electrode layer 21 as a sintered electrode layer and the second electrode layer 23 as a plated layer. Therefore, the electrode portions 5a, 7a can be securely connected to the via conductors 36, 38 formed in the via holes. Particularly, in a case where the via conductors are formed by plating, the via conductors 36, 38 and the electrode portions 5a, 7a are more securely connected to each other.

The length of the electrode portions 5a, 7a in the longitudinal direction of the element body 2 is set longer than the space between the electrode portions 5a and the electrode portions 7a in the longitudinal direction of the element body 2. In this case, the area of the electrode portions 5a, 7a is also relatively large and thus the electrode portions 5a, 7a can be securely connected to the via conductors 36, 38.

In the multilayer capacitor C1, the element body 2 includes the first element body portion 3a and the pair of second element body portions 3b arranged with the first element body portion 3a in between in the height direction of the element body 2, and the thickness of the first element body portion 3a is equal to the thickness of the second element body portion 3b. The second element body portions 3b function as protecting layers and the thickness thereof is relatively large. As a consequence, while ensuring the capacitance, the element body 2 can be prevented from cracking, in the multilayer capacitor C1.

Figure 7:
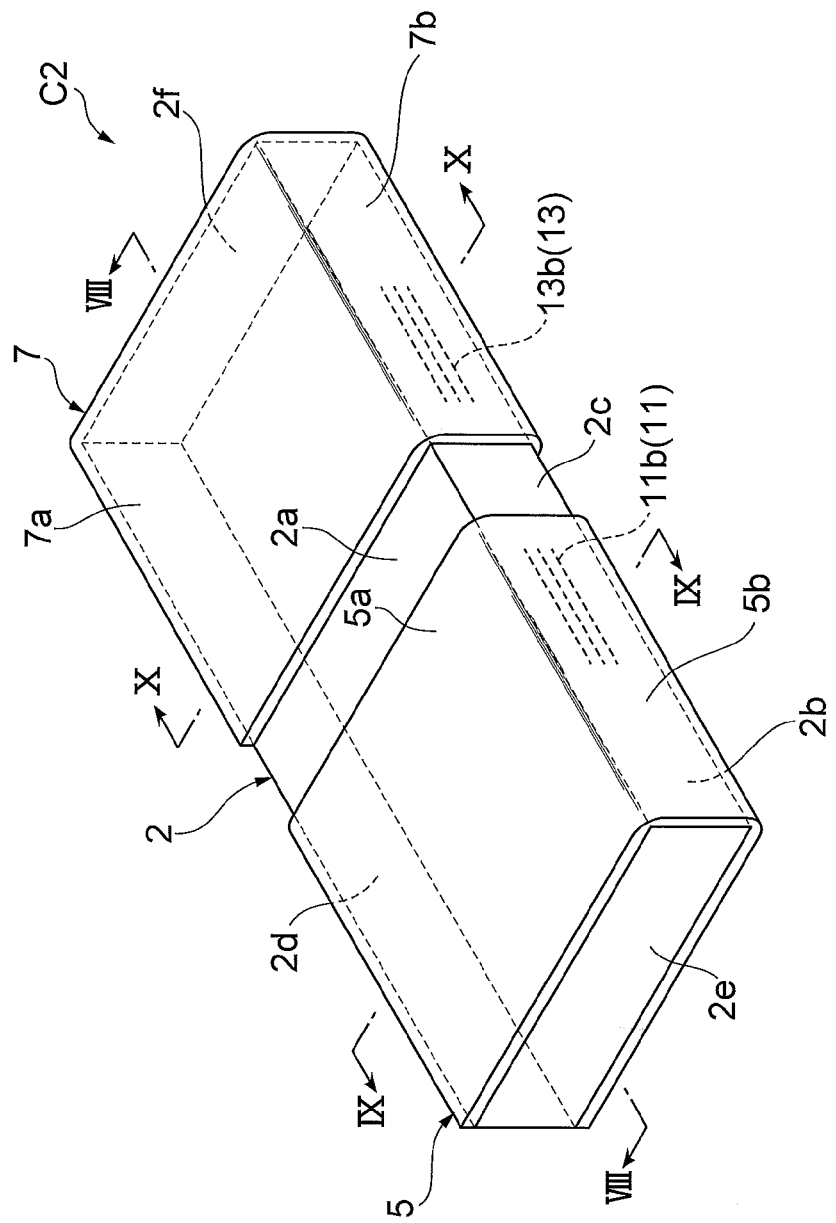
FIG. 7 is a perspective view showing a multilayer capacitor according to a modification example of the embodiment.
Figure 8:
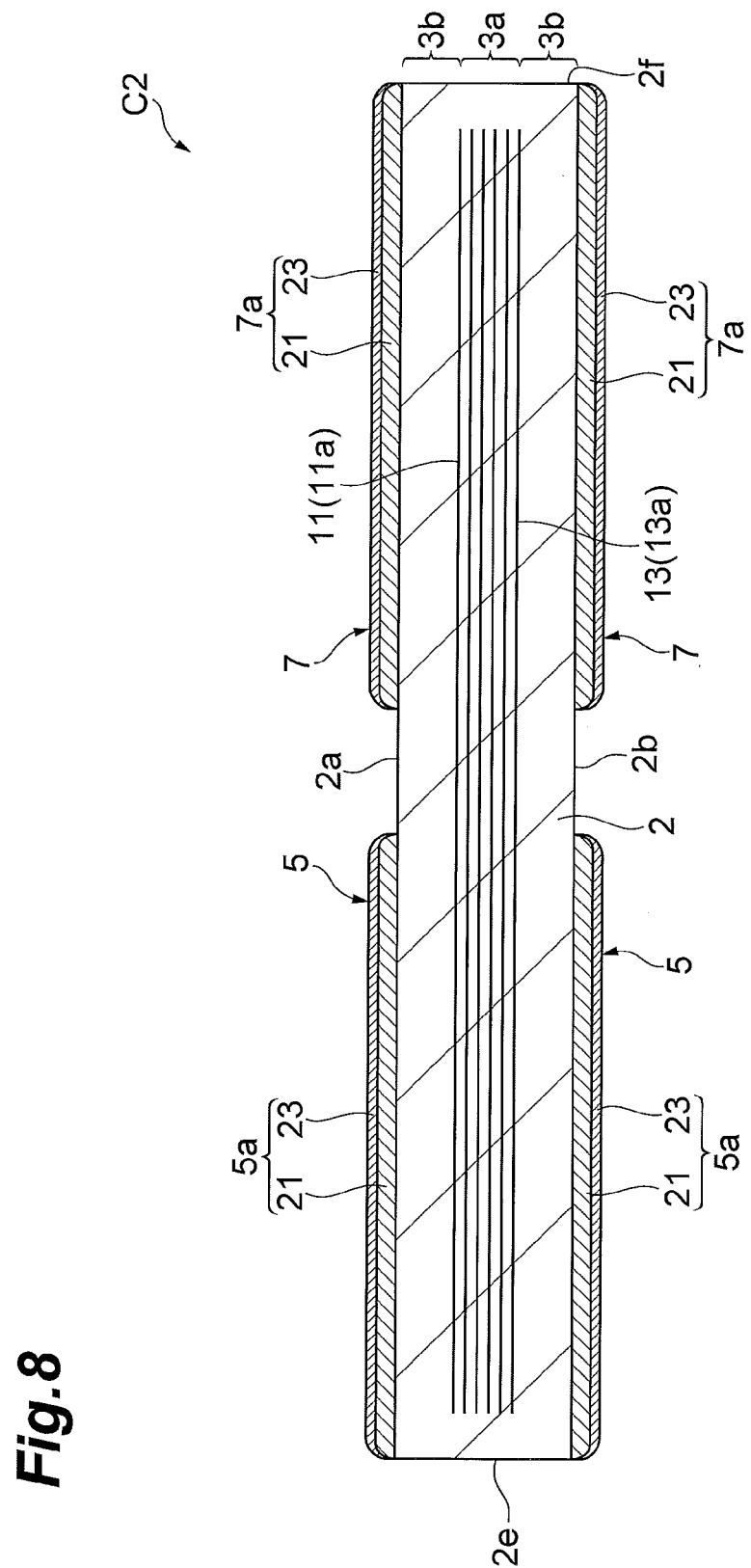
FIG. 8 is a drawing for explaining a cross-sectional configuration along the line VIII-VIII in FIG. 7.
Figure 9:
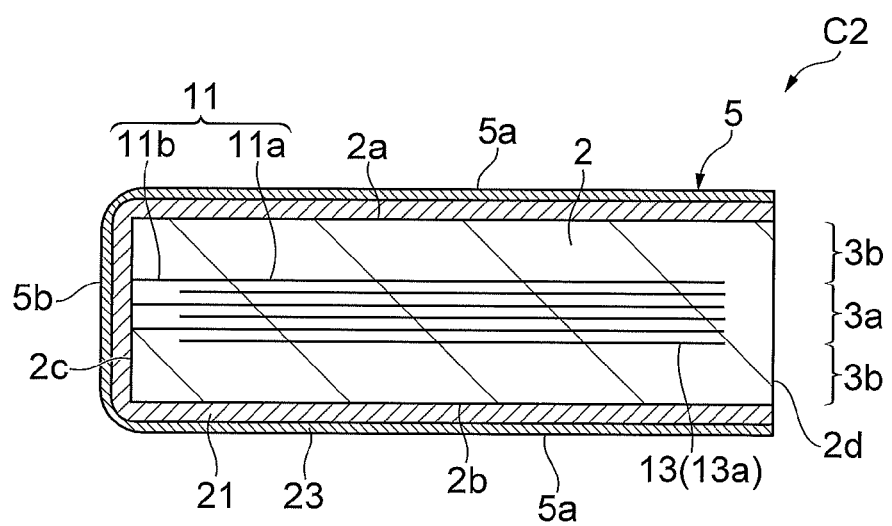
FIG. 9 is a drawing for explaining a cross-sectional configuration along the line IX-IX in FIG. 7.
Figure 10:
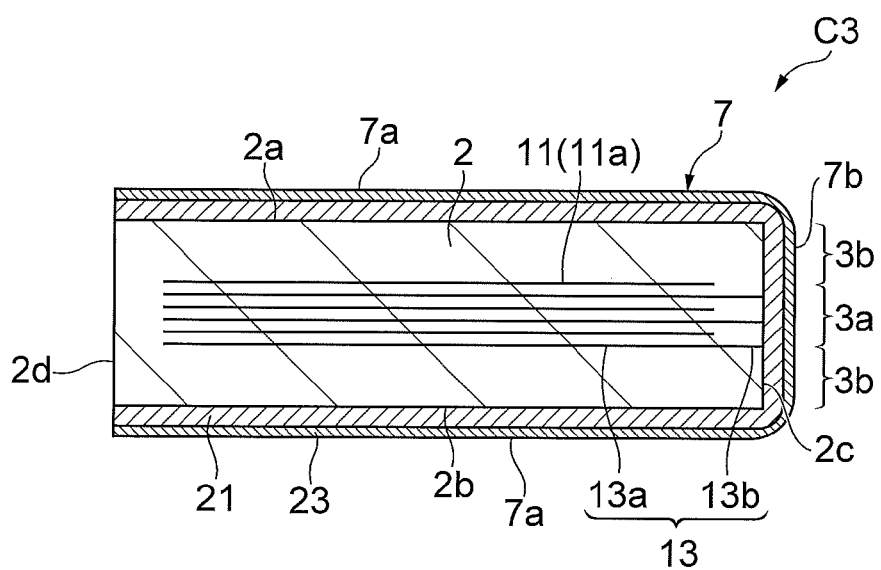
FIG. 10 is a drawing for explaining a cross-sectional configuration along the line X-X in FIG. 7.

A configuration of a multilayer capacitor C2 according to a modification example of the embodiment will be described below with reference to FIGS. 7 to 10. FIG. 7 is a perspective view showing the multilayer capacitor according to the present modification example. FIG. 8 is a drawing for explaining a cross-sectional configuration along the line VIII-VIII in FIG. 7. FIG. 9 is a drawing for explaining a cross-sectional configuration along the line IX-IX in FIG. 7. FIG. 10 is a drawing for explaining a cross-sectional configuration along the line X-X in FIG. 7.

The multilayer capacitor C2, as shown in FIGS. 7 to 10, is also provided with the first terminal electrode 5 and the second terminal electrode 7. The multilayer capacitor C2 is different from the multilayer capacitor C1 in that the terminal electrodes 5, 7 are not arranged on the second side face 2d.

Each first internal electrode 11, as shown in (a) of FIG. 11, includes the main electrode portion 11a and one leading portion 11b. The leading portion 11b extends from the main electrode portion 11a and is exposed in the first side face 2c. Each second internal electrode 13, as shown in (b) of FIG. 11, includes the main electrode portion 13a and one leading portion 13b. The leading portion 13b extends from the main electrode portion 13a and is exposed in the first side face 2c.

The position where the leading portion 11b is exposed in the first side face 2c is nearer to the third side face 2e with respect to the centers of the first and second side faces 2c, 2d in the longitudinal direction of the element body 2. The position where the leading portion 13b is exposed in the first side face 2c is nearer to the fourth side face 2f with respect to the centers of the first and second side faces 2c, 2d in the longitudinal direction of the element body 2. The first and second internal electrodes 11, 13 are directly exposed in only the first side face 2c but not exposed in the first and second principal faces 2a, 2b, nor in the second to fourth side faces 2d, 2e, and 2f.

The first terminal electrode 5 has a pair of electrode portions 5a arranged on the first and second principal faces 2a, 2b, and one electrode portion 5b arranged on the first side face 2c. The electrode portion 5b is located nearer to the third side face 2e with respect to the center of the first side face 2c in the longitudinal direction of the element body 2. The second terminal electrode 7 has a pair of electrode portions 7a arranged on the first and second principal faces 2a, 2b, and one electrode portion 7b arranged on the first side face 2c. The electrode portion 7b is located nearer to the fourth side face 2f with respect to the center of the first side face 2c in the longitudinal direction of the element body 2.

The terminal electrodes 5, 7 are not arranged on the second to fourth side faces 2d, 2e, and 2f of the element body 2. For this reason, the second to fourth side faces 2d, 2e, and 2f of the element body 2 are exposed.

In the present modification example as well, as described above, the distance between the leading portions 11b, 13b is shorter between the internal electrodes 11, 13 adjacent in the height direction of the element body 2 and different in polarity. Therefore, the electric current path is shorter in the multilayer capacitor C2, thus achieving reduction of ESL.

In the multilayer capacitor C2, not only the third and fourth side faces 2e, 2f of the element body 2 but also the second side face 2d is exposed; the terminal electrodes 5, 7 are not arranged on these second to fourth side faces 2d, 2e, and 2f. Therefore, there is no increase in the length of the multilayer capacitor C2 in the longitudinal direction of the element body 2, nor in the length in the width direction of the element body 2, thus allowing easy achievement of downsizing of the multilayer capacitor C2.

Figure 12:
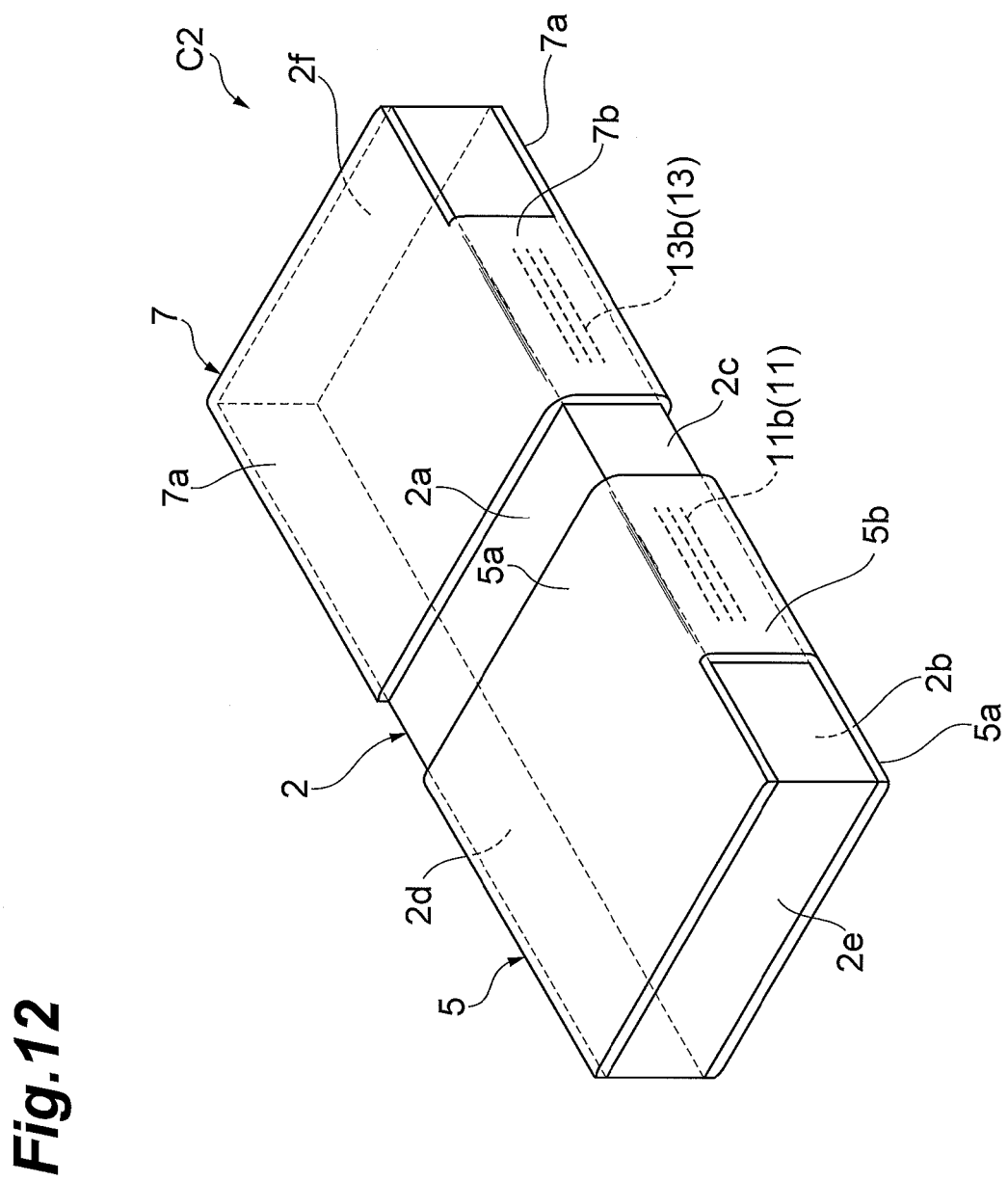
FIG. 12 is a perspective view showing a multilayer capacitor according to another modification example.
Figure 13:
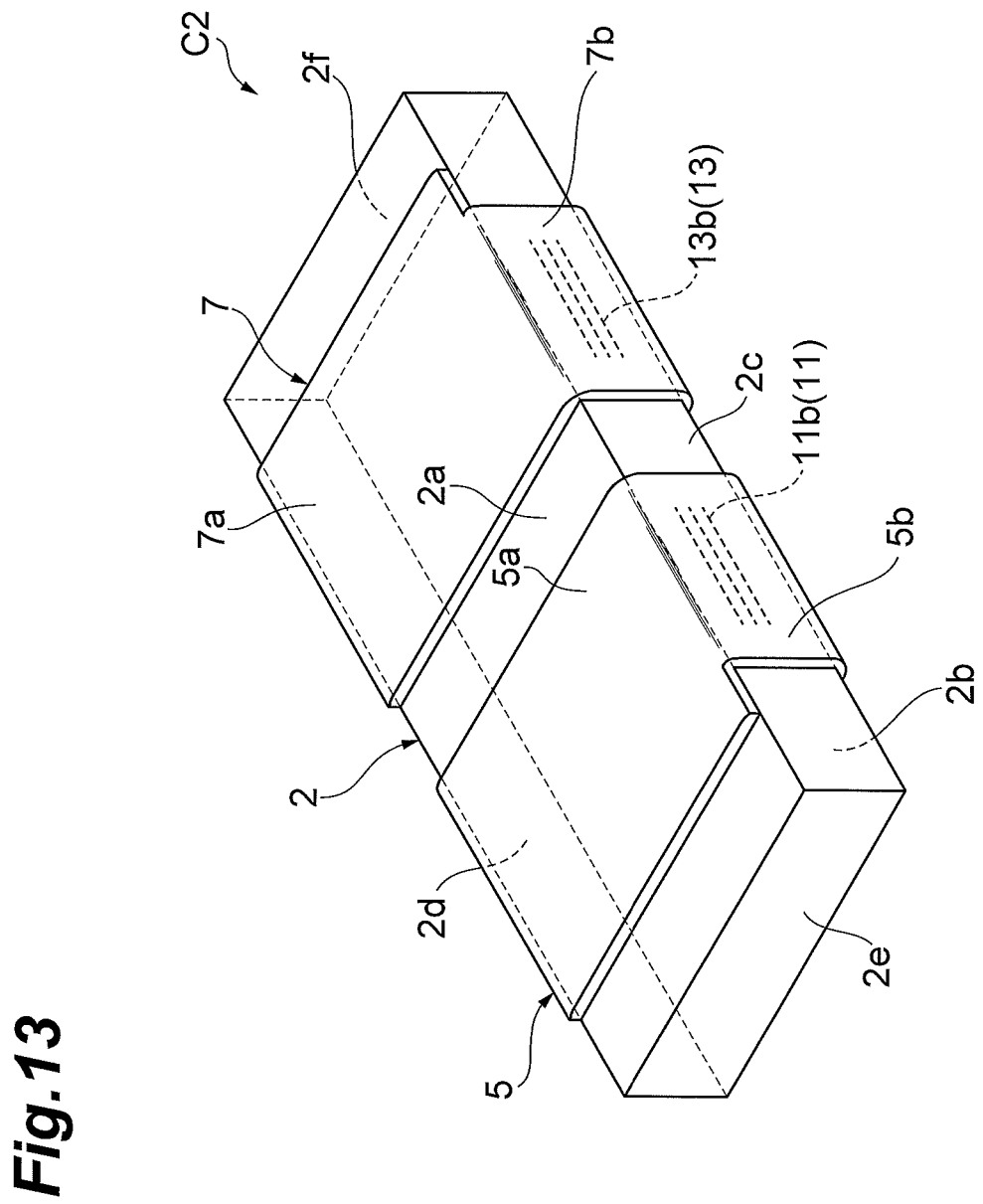
FIG. 13 is a perspective view showing a multilayer capacitor according to still another modification example.
Figure 14:
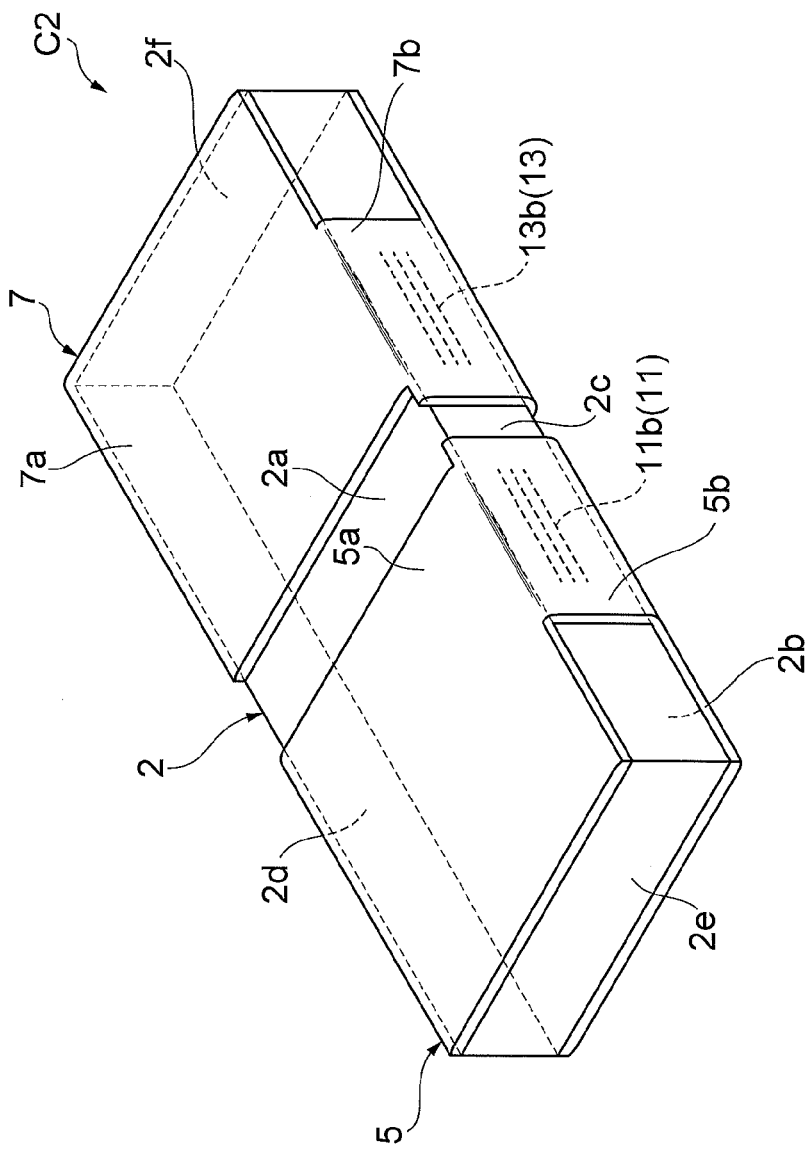
FIG. 14 is a perspective view showing a multilayer capacitor according to still another modification example.

Next, configurations of modification examples of the foregoing multilayer capacitor C2 will be described with reference to FIGS. 12 to 14. FIGS. 12 to 14 are perspective views showing multilayer capacitors according to modification examples of the present embodiment.

In the modification example shown in FIG. 12, the length of the electrode portions 5b, 7b in the longitudinal direction of the element body 2 is set shorter than the length of the electrode portions 5a, 7a in the longitudinal direction of the element body 2. A region near the third side face 2e and a region near the fourth side face 2f in the first side face 2c of the element body 2 are exposed.

In the present modification example, since the length of the electrode portions 5b, 7b in the longitudinal direction of the element body 2 is set shorter than the length of the electrode portions 5a, 7a in the longitudinal direction of the element body 2, the area of the electrode portions 5b, 7b is relatively smaller. For this reason, less stress is generated in forming the electrode portions on the element body 2, whereby the element body 2 can be prevented from suffering from a structural defect such as a crack. The stress in the element body 2 is more likely to be notably generated when the electrode portions 5b, 7b include the sintered electrode layer formed on the element body 2. Therefore, this configuration is effective, particularly, in the present modification example wherein the electrode portions 5b, 7b include the first electrode layer 21 as sintered electrode layer.

In the present modification example, the region near the third side face 2e and the region near the fourth side face 2f in the first side face 2c of the element body 2 are exposed. This configuration also makes the area of the electrode portions 5b, 7b relatively smaller. Therefore, as described above, less stress is generated in forming the electrode portions 5b, 7b on the element body 2, whereby the element body 2 can be prevented from suffering from a structural defect such as a crack.

As in the modification example shown in FIG. 13, regions near the third side face 2e and regions near the fourth side face 2f in the first and second principal faces 2a, 2b may be exposed. In this case, the area of the electrode portions 5a, 7a is relatively smaller and less stress is generated in forming the electrode portions 5a, 7a on the element body 2. This configuration can prevent the element body 2 from suffering from a structural defect such as a crack.

In the modification example shown in FIG. 14, the electrode portions 5b, 7b are arranged nearer to the center in the longitudinal direction of the element body 2 than the electrode portions 5a, 7a are. The space between the electrode portion 5b and the electrode portion 7b is smaller than the space between the electrode portions 5a and the electrode portions 7a. This makes the distance between the extractions portions 11b, 13b much smaller between the internal electrodes 11, 13 different in polarity, thereby achieving further reduction of ESL.

The above described the preferred embodiments of the present invention but it should be noted that the present invention is not always limited to the above embodiments and can be modified in many ways without departing from the spirit and scope of the invention.

The width of the leading portions 11b, 13b (the length in the longitudinal direction of the element body 2) does not have to be limited to that shown in FIGS. 5 and 11. For example, the width of the leading portions 11b, 13b may be set longer than the width shown in FIGS. 5 and 11 (cf. FIGS. 15 and 16). In this case, the contact area between the leading portions 11b, 13b and the electrode portions 5b, 7b is increased, which can improve the connection strength between the element body 2 and each terminal electrode 5, 7.

Figure 17:
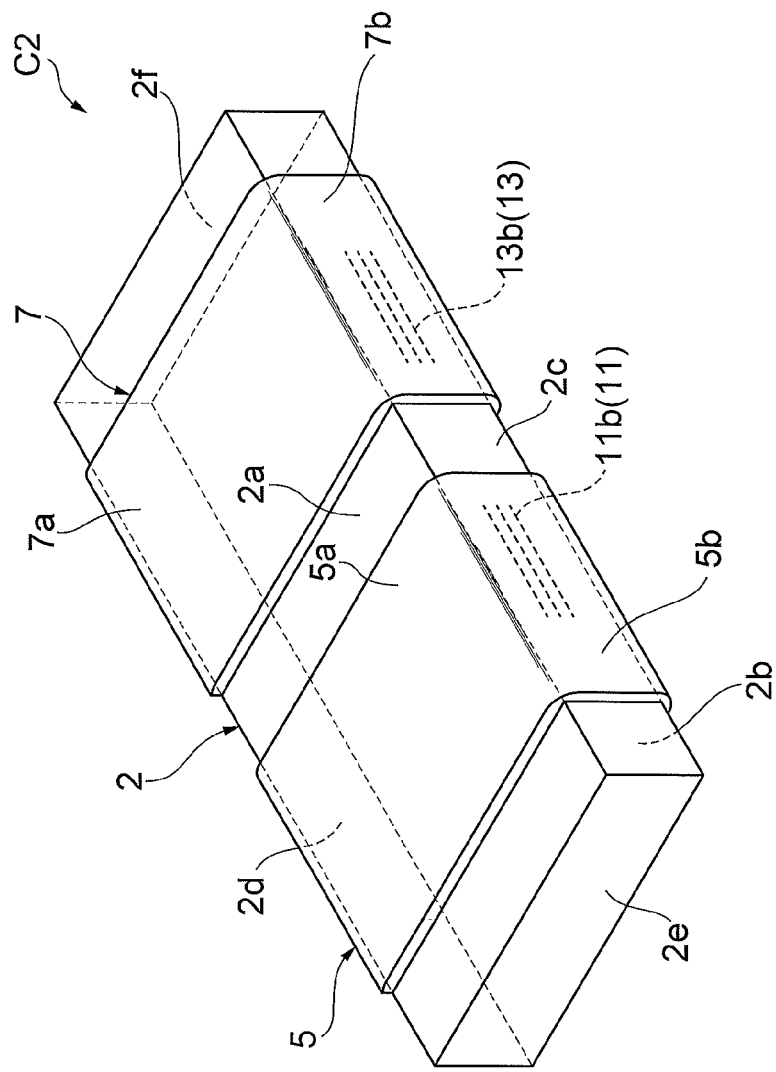
FIG. 17 is a perspective view showing a multilayer capacitor according to still another modification example.

The width of the first and second terminal electrodes 5, 7 (the length in the longitudinal direction of the element body 2) does not have to be limited to that in the above-described embodiment and modification examples. For example, the width of the first and second terminal electrodes 5, 7 may be set shorter than the width shown in FIG. 7 (cf. FIG. 17).

The electrode portions 5a, 7a are arranged on the first principal face 2a and the second principal face 2b in the above-described embodiment and modification examples, but the present invention is not limited to this configuration. For example, the electrode portions 5a, 7a may be arranged on only one of the first principal face 2a and the second principal face 2b.

FIG. 6 shows the structure in which the multilayer capacitor C1 is mounted as buried in the substrate 31, but the multilayer capacitor C2 may be mounted instead as buried in the substrate 31. The shapes of the first and second terminal electrodes 5, 7 in the modification examples shown in FIGS. 12 to 14, and 17 can also be applied to the multilayer capacitor C1. In this case, the positions and shapes of the electrode portions 5b, 7b arranged on the second side face 2d are the same as those of the electrode portions 5b, 7b arranged on the first side face 2c.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
an element body having a substantially rectangular parallelepiped shape whose length in a longitudinal direction and length in a width direction are larger than a length in a height direction, and having first and second principal faces opposed to each other in the height direction, first and second side faces extending in the height direction so as to connect the first and second principal faces and opposed to each other in the width direction, and third and fourth side faces extending in the height direction so as to connect the first and second principal faces and opposed to each other in the longitudinal direction;
a plurality of internal electrodes which are alternately arranged in the element body so as to be opposed to each other in height direction of the element body and each of which has a main electrode portion opposed to another main electrode portion in the height direction of the element body and a leading portion extending from the main electrode portion to be exposed in the first side face; and
a plurality of terminal electrodes each of which has a first electrode portion arranged on the first principal face, and a second electrode portion arranged on the first side face and connected to the leading portion of each corresponding internal electrode out of the plurality of internal electrodes,
wherein the second electrode portion is arranged nearer to a center in the longitudinal direction of the element body than the first electrode portion is.

2. The multilayer capacitor according to claim 1, wherein the third and fourth side faces of the element body are exposed.

3. The multilayer capacitor according to claim 1, wherein a length of the first electrode portion in the width direction of the element body is larger than the length in the height direction of the element body.

4. The multilayer capacitor according to claim 1, wherein each of the plurality of terminal electrodes has only the first electrode portion, the second electrode portion, and a third electrode portion arranged on the second principal face, and
an entire surface of the second side face of the element body is exposed.

5. The multilayer capacitor according to claim 1, wherein the first electrode portion has a sintered electrode layer arranged on the first principal face, and a plated layer arranged on the sintered electrode layer.

6. The multilayer capacitor according to claim 1, wherein a length of the second electrode portion in the longitudinal direction of the element body is smaller than a length of the first electrode portion in the longitudinal direction of the element body.

7. The multilayer capacitor according to claim 1, wherein a region near the third side face and a region near the fourth side face in the first side face of the element body are exposed.

8. The multilayer capacitor according to claim 1, wherein the element body includes a first element body portion in which the plurality of internal electrodes are arranged, and a pair of second element body portions arranged with the first element body, and
wherein a length of the first element body portion in the height direction of the element body is equal to a length of the second element body portion in the height direction of the element body.

9. An electronic device comprising:
a plurality of electrodes arranged on a surface of the electronic device; and
the multilayer capacitor according to claim 1 buried in the electronic device,
each of the first electrode portions is electrically connected through a via conductor to a corresponding electrode on the surface of the electronic device.

10. The multilayer capacitor according to claim 1, wherein a space between the first electrode portions adjacent in the longitudinal direction of the element body is smaller than a length of the first electrode portion in the longitudinal direction of the element body.

11. The multilayer capacitor according to claim 1, wherein a length of the first electrode portion in the longitudinal direction of the element body is larger than a space between the first electrode portions adjacent in the longitudinal direction of the element body.

12. A multilayer capacitor comprising:
an element body having a substantially rectangular parallelepiped shape whose length in a longitudinal direction and length in a width direction are larger than a length in a height direction, and having first and second principal faces opposed to each other in the height direction, first and second side faces extending in the height direction so as to connect the first and second principal faces and opposed to each other in the width direction, and third and fourth side faces extending in the height direction so as to connect the first and second principal faces and opposed to each other in the longitudinal direction;
a plurality of internal electrodes which are alternately arranged in the element body so as to be opposed to each other in the height direction of the element body and each of which has a main electrode portion opposed to another main electrode portion in the height direction of the element body and a leading portion extending from the main electrode portion to be exposed in the first side face; and a plurality of terminal electrodes each of which has only a first electrode portion arranged on the first principal face, a second electrode portion arranged on the first side face and connected to the leading portion of each corresponding internal electrode out of the plurality of internal electrodes, and a third electrode portion arranged on the second principal face, wherein an entire area of the second side face of the element body is exposed, and a space between the first electrode portions adjacent in the longitudinal direction of the element body is smaller than a length of the first electrode portion in the longitudinal direction of the element body.

13. An electronic device comprising:

a plurality of electrodes arranged on a surface of the electronic device; and the multilayer capacitor according to claim 12 buried in the electronic device, wherein each of the first electrode portions electrically connected through a via conductor to a corresponding electrode on the surface of the electronic device.

* * * * *